A. MONARD.
WATER METER WITH ROTARY PISTON.
APPLICATION FILED MAY 5, 1913.

1,179,208.

Patented Apr. 11, 1916.
3 SHEETS—SHEET 1.

Inventor
Alfred Monard
by B. Singer
Atty.

A. MONARD.
WATER METER WITH ROTARY PISTON.
APPLICATION FILED MAY 5, 1913.

1,179,208.

Patented Apr. 11, 1916.
3 SHEETS—SHEET 3.

UNITED STATES PATENT OFFICE.

ALFRED MONARD, OF PARIS, FRANCE, ASSIGNOR TO SOCIETE ANONYME L'ASTER, OF PARIS, FRANCE, A CORPORATION OF FRANCE.

WATER-METER WITH ROTARY PISTON.

1,179,208.  Specification of Letters Patent.  Patented Apr. 11, 1916.

Application filed May 5, 1913. Serial No. 765,699.

*To all whom it may concern:*

Be it known that I, ALFRED MONARD, citizen of the Republic of France, and residing at 74 Rue de la Victoire, Paris, France, have invented new and useful Improvements in Water-Meters with Rotary Pistons, of which the following is a specification.

This invention relates to water meters of the rotary piston type and has for its object improvements therein for the purpose of increasing the sensitiveness and accuracy, facilitating the construction, and perfecting the operation of such meters.

Figure 1:
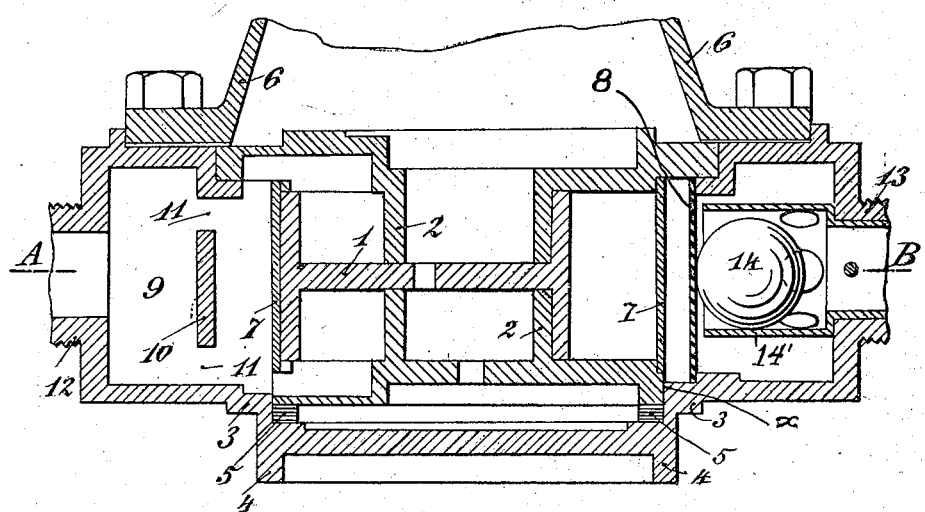
Figure 2:
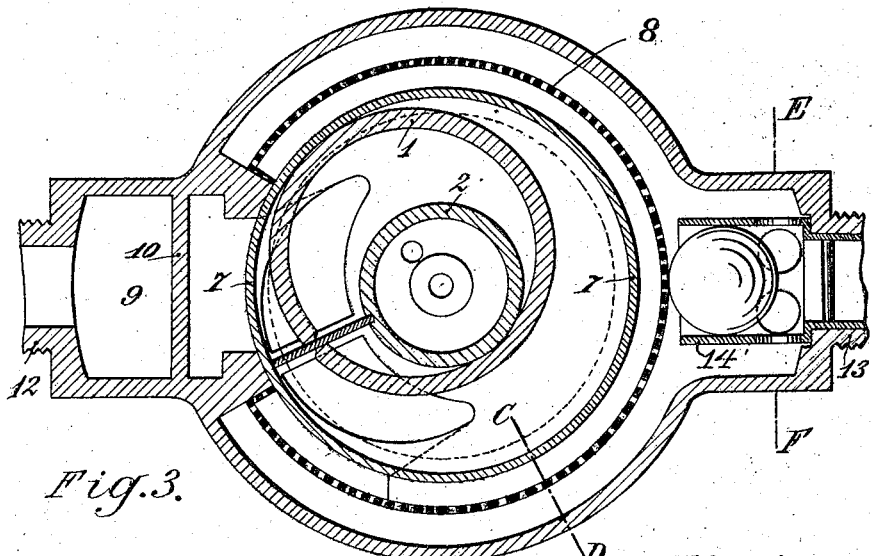
Figure 3:
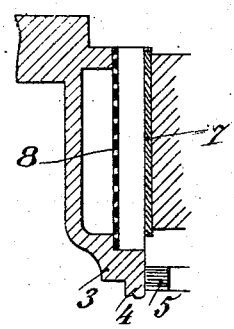
Figure 4:
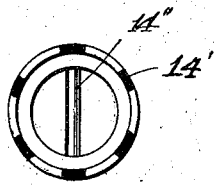
Figure 8:
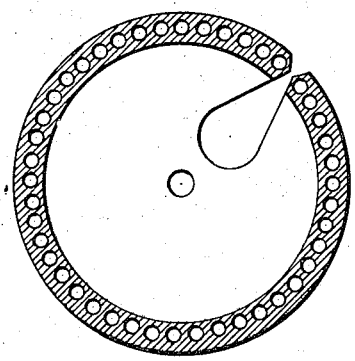
Figure 9:
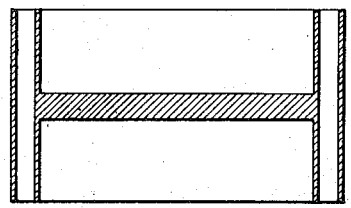
Figure 10:
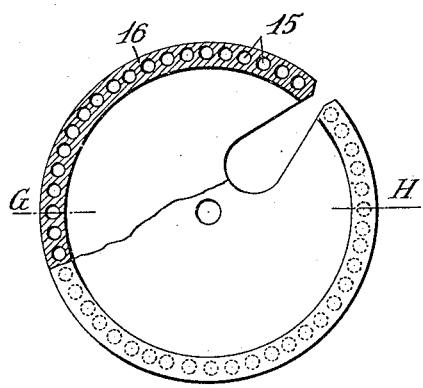
Figure 12:
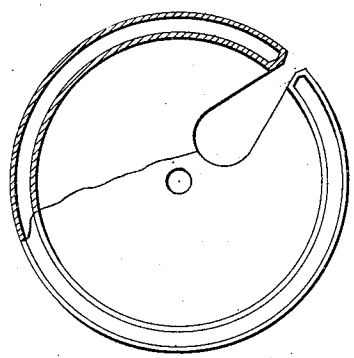
Figure 11:
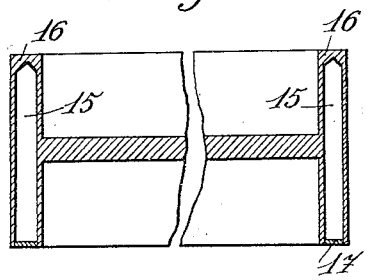
Figure 13:
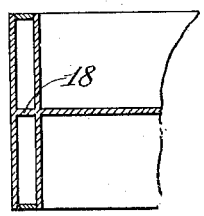

In the accompanying drawings, Figure 1 is a sectional elevation of the bottom portion of the meter according to this invention, Fig. 2 is a horizontal section on line A—B of Fig. 1, Fig. 3 is a section on line C—D of Fig. 2, Fig. 4 is a detail view, in section on line E—F of Fig. 2, Figs. 5–9 are detail views of different constructions of the rotary piston, Fig. 10 is a plan of a construction enabling the weight of the rotary piston in the liquid in which it is immersed, to be rendered zero, Fig. 11 is a section on line G—H of Fig. 10 and Figs. 12 and 13 are respectively a plan and a diametral section of another construction of the piston.

In the improved construction illustrated in Figs. 1 and 2, the cylindrical box containing the rotary piston 1, consists of a nickel jacket 7, and the central diaphragm of the rotary piston 1 moves between two similar superposed sleeves 2 between which is left sufficient space for the working of the said diaphragm. In previous meters of this kind, it was necessary that the sleeves 2 should fit exactly both the upper portion of the cylindrical boss 3, and the flat bottom 4 of the box of the piston and if the said fitting was not absolutely accurate, it was likely to lead to leakages affecting the accuracy of the indications supplied by the meter. In order to avoid this drawback, the bottom 4 of the boss which in this case supports the box directly has been provided with a recess, on the bottom of which is placed a ring 5 of elastic material such as for instance rubber, on which rests the bottom portion of the lower sleeve 2, so that, by tightening the cap 6 of the meter by means of its screws or bolts, the whole of the two sleeves and of the nickel jacket 7 connecting them, by passing at the top and at the bottom into two inner mortises $x$ provided for the purpose, is strongly pressed against the elastic packing 5 which is squeezed to the necessary extent, and in these conditions, it is not essential to have an exceedingly accurate fitting or adjustment, for it is sufficient to give the whole of the elements a suitable height for compressing the said packing and insuring perfect contact of the parts above referred to.

In the construction described, in the discharge branch 9 is arranged a transverse partition 10 leaving at its upper portion as well as its lower portion, passages 11 of the same cross-section for the liquid, and the said partition 10 is exactly opposite the discharge branch 12. In these conditions, when the apparatus is detached from the pipe, it is protected from disturbances that could accidentally come from the outside, and for instance from foreign substances introduced through the branch 12. Owing to the arrangement of the partition 10, it is absolutely impossible for any disturbance from the outside, to cause any damage to the working of the apparatus.

At the side of the inlet branch 13, it is not necessary to provide a similar arrangement, because at that side is generally arranged a valve casing 14' containing a spherical or other valve 14 which stops the introduction of any substance, and it is impossible for such to reach the jacket 7, or even the filter 8, which in any case itself protects the said jacket. In the casing 14' is arranged a stop bar 14'' which prevents the valve 14 from entering the passage so far as to cause the same to stick.

Figure 5:
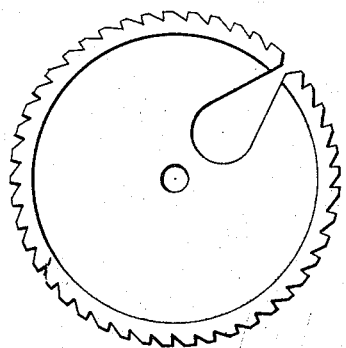
Figure 6:
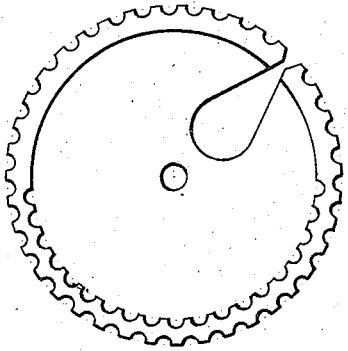
Figure 7:
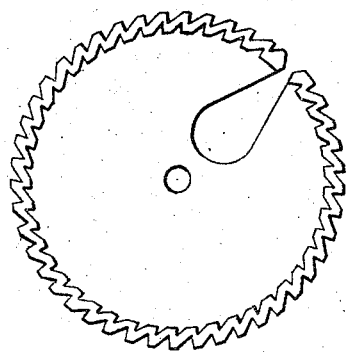

It will be understood that in a meter of that kind, it is important that the piston should be as light as possible, for if it is heavy, it offers a resistance which interferes with its facility of movement. On the other hand, the heavier it is, the greater will be the friction of its bottom face on its guide surface, the quicker the wear and the clearance between the sleeves 2 will increase so that leaks will be produced, and sensitiveness decreased. For all these reasons combined, the accuracy of the indications supplied by the apparatus is affected to a certain extent. It has been therefore attempted to lighten the piston 1 by providing it with grooves along its generatrices as shown in Figs. 5–7, which do not cause leaks, or by providing the cylindrical body with holes passing right through the same (Figs. 8 and 9). The grooves may have any suitable shape and be made either on the outer surface only, or on the inner surface, or on both these surfaces. In that way, a very light piston is obtained, which considerably reduces the drawbacks above referred to. The sensitiveness and the accuracy of the apparatus could be still further increased by means of a piston constructed in such manner that its weight in the liquid into which it is immersed, should be approximately zero. It will be understood in fact that such a piston is in a state of indifferent equilibrium in the liquid, that it is supported in the latter and does not offer any resistance to its driving by the moving liquid.

The weight of an ordinary piston applied to its guiding face, produces friction directly in proportion to said weight; by doing away with the weight, the friction, and consequently the wear, are eliminated. Moreover the friction has a retarding influence, which reduces the sensitiveness and the accuracy of working, which is a further reason in favor of eliminating the weight by designing a piston the weight of which in the liquid in which it is immersed, is zero. These important advantages are obtained by one of the constructions shown in Figs. 10–13.

The piston is preferably made of light material, such as ebonite, although any other material could be chosen, for it will be readily understood that whatever be the material used, this piston will have no weight in the liquid in which it will have to move.

For obtaining the result in question, the piston is recessed by providing its cylindrical wall with holes 15 (Figs. 10 and 11) of a suitable number, but so as to leave to each of them a bottom 16, while the other end is sealed by a plug 17 or left open, each hole thus forming an air bell into which the liquid is unable to enter.

In the construction shown in Figs. 12 and 13, the cylindrical wall of the piston is completely recessed, and in order not to weaken the part, there may be provided about the middle of the height, a partition 18 which stays and strengthens the remaining parallel cylindrical partitions, the ends being of course closed, as in the preceding case. In these conditions, it will be understood that the piston can be of no weight in the liquid in which it has to work, which does away radically with the drawbacks mentioned for pistons heavier than water or other liquid, according to circumstances.

The examples illustrated are not the only ones that could be used in practice. It will be sufficient to recess the thickness of the cylindrical wall in any desired manner for insuring the result aimed at, and such a piston is applicable to any types of rotary meters. It is obvious that the same means could be utilized for rendering the piston lighter than the liquid in which it is immersed, if it considered advisable.

Having now particularly described and ascertained the nature of the said invention and in what manner the same is to be performed, I declare that what I claim is:—

1. In a water meter, the combination of a casing, superposed sleeves arranged in said casing, resilient means interposed between one of said sleeves and the casing, a piston operating between the sleeves and adapted to permit movement of one of the sleeves relative to the other incident to wear, and a cap on the casing coacting with the other of the sleeves aforesaid whereby to permit of the control of the fitting of said sleeves and piston relatively to one another by the resilient means aforesaid.

2. In a water meter, the combination of a casing comprising a bottom, a pair of superposed sleeves mounted in the casing, an elastic member interposed between one of said sleeves and the bottom of the casing, an oscillatory piston operating intermediate the two sleeves, and having a part engaging and spacing the sleeves apart; and means on the casing engaging the other one of the sleeves to regulate the action of said elastic member to thus control the fitting of the sleeve and piston parts relatively to one another.

3. In a water meter, the combination with a casing, and superimposed sleeves arranged in said casing, of resilient means interposed between one of the sleeves and the casing, a piston having a moving part arranged between and engaged by the sleeves and retaining the sleeves out of contact with each other, and a cap coacting to control the feeding of the sleeves and piston relative to each other incident to the action of the resilient means aforesaid.

4. In a water meter, the combination of a casing having an inlet and an outlet, a jacket in said casing and forming a piston chamber, a piston operating in said chamber of the jacket, sleeves mounted in the casing on opposite sides of the piston and forming bearings for the latter, and a partition intermediate the outlet and said jacket constituting a guard preventing unauthorized access to the piston chamber, the casing, and sleeves aforesaid being formed with passages affording tortuous communication intermediate the inlet and the piston chamber.

In testimony whereof I affix my signature in presence of two witnesses.

ALFRED MONARD.

Witnesses:
 JULES BEL,
 HANSON C. COXE.